US008310554B2

(12) United States Patent
Aggarwal et al.

(10) Patent No.: US 8,310,554 B2
(45) Date of Patent: Nov. 13, 2012

(54) METHOD AND APPARATUS FOR PERFORMING COORDINATED MULTI-PTZ CAMERA TRACKING

(75) Inventors: Manoj Aggarwal, Plainsboro, NJ (US); Deepak Sethi, Bangalore (IN); Supun Samarasekera, Princeton, NJ (US); Vince Paragano, Yardley, PA (US)

(73) Assignee: SRI International, Menlo Park, CA (US)

( * ) Notice: Subject to any disclaimer, the term of this patent is extended or adjusted under 35 U.S.C. 154(b) by 1381 days.

(21) Appl. No.: 11/524,134

(22) Filed: Sep. 20, 2006

(65) Prior Publication Data

US 2007/0064107 A1 Mar. 22, 2007

Related U.S. Application Data

(60) Provisional application No. 60/718,637, filed on Sep. 20, 2005.

(51) Int. Cl.
*H04N 5/232* (2006.01)

(52) U.S. Cl. ............... 348/211.11; 348/139; 348/143; 348/153; 348/159; 348/211.14

(58) Field of Classification Search .......... 348/169–172, 348/143, 152, 153, 157, 159, 207.1, 207.11, 348/207.99, 211.3
See application file for complete search history.

(56) References Cited

U.S. PATENT DOCUMENTS

2005/0134685 A1* 6/2005 Egnal et al. ................... 348/157
* cited by examiner

*Primary Examiner* — Sath V Perungavoor
*Assistant Examiner* — Nathnael Aynalem
(74) *Attorney, Agent, or Firm* — Moser Taboada

(57) ABSTRACT

A system for tracking at least one object is disclosed. The system includes a plurality of communicatively connected visual sensing units configured to capture visual data related to the at least one object The system also includes a manager component communicatively connected to the plurality of visual sensing units. The manager component is configured to assign one visual sensing unit to act as a visual sensing unit in a master mode and at least one visual sensing unit to act as a visual sensing unit in a slave mode. The manager component is further configured to transmit at least one control signal to the plurality of visual sensing units, and receive the visual data from the plurality of visual sensing units.

17 Claims, 3 Drawing Sheets

FIG. 2
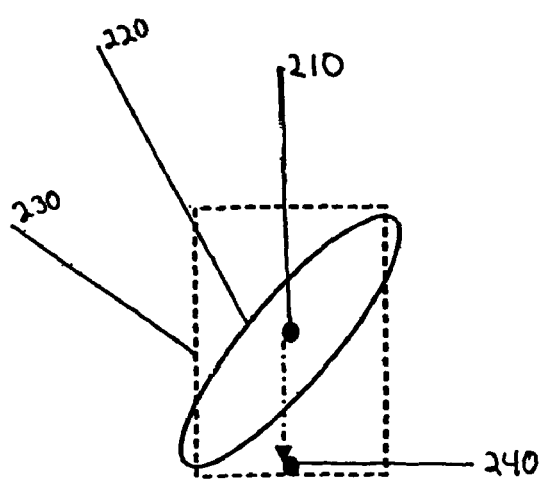 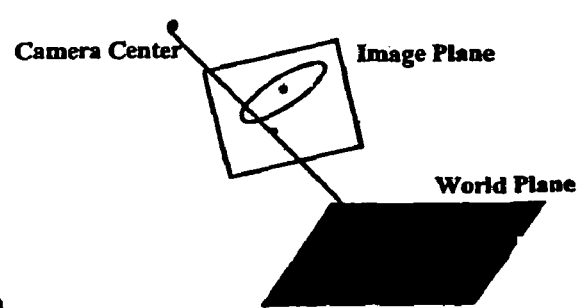
FIG. 2A           FIG. 2B

METHOD AND APPARATUS FOR PERFORMING COORDINATED MULTI-PTZ CAMERA TRACKING

CROSS-REFERENCE TO RELATED APPLICATION

This application claims the benefit of U.S. Provisional Application 60/718,637, filed Sep. 20, 2005. The entire disclosure of U.S. Provisional Application Ser. No. 60/718,637 is hereby incorporated herein by reference.

FIELD OF THE INVENTION

Embodiments of the present invention generally relate to video surveillance methods and systems and in particular to a method and apparatus for coordinating pan, tilt and zoom (PTZ) cameras to track activities where the field of view of certain of the PTZ cameras may include occlusions.

BACKGROUND OF THE INVENTION

A key need for border security is the ability for rapid visual assessment, verification, classification, and continuous tracking and localization of possibly multiple simultaneous threats, detected by wide area sensors such as radar, fence sensor, and local sensors (e.g., acoustics and under-ground seismic sensors).

Radar, fence, acoustics and seismic sensors provide the first line of threat detection capability, but do not provide visual feedback. Video-based visual assessment provides the necessary and the key mechanism for the operator-in-the-loop to make an assessment of the threat.

Video provides a complementary data source that can be used to verify detections by the non-visual sensors. This has the capability of significantly reducing the number of false alerts.

There is a finite time delay between an intrusion, dispatch of a response team, and eventual interception of the intruder. This time delay introduces ambiguity in the location of the intruder, which essentially impacts the ability of the response team to quickly intercept the intruder. Radar cued or standalone PTZ video based tracking and localization provides the necessary location and visual information to aid the responders to hone in on to the intruder quickly and with proper force and equipment to counteract the threat as assessed using visual inference.

Serious threats involving drug trafficking or terrorist transit typically involve multi-pronged intrusions, some of which serve as decoy to overwhelm the system to maximize probability of successful intrusion of desired elements. An effective system should be able to provide continuous assessment of multiple threats, with limited intervention of the operator.

PTZ cameras are routinely used in video surveillance applications to track activity over a wide area. Even though a single PTZ can pan all around (360 degrees), large areas of interests may get occluded due to buildings, trees and the like. As a result, an object being tracked may temporarily—or even permanently—get lost during a period where there is an occlusion.

Thus, there is a need in the art for a video surveillance method and apparatus that addresses this known problem of temporarily or permanently losing the activity or object being tracked by PTZ cameras due to occlusions.

SUMMARY OF THE INVENTION

Embodiments of the present invention generally relate to a method and apparatus for tracking one or more objects over an entire area of interest, using a plurality of PTZs situated to cover for each other's occlusion areas, in combination with a technology to handoff object tracks from one PTZ to another. The term "object track" is known to those of skill in the art.

Embodiments of the present invention provide a phased approach to systematically addressing the needs for visual assessment, verification, classification, tracking and localization and multiple threat handling.

Embodiments of the present invention include a system for tracking at least one object, comprising: a plurality of communicatively connected visual sensing units configured to capture visual data related to the at least one object; and a manager component communicatively connected to the plurality of visual sensing units, where the manager component is configured to assign one visual sensing unit to act as a visual sensing unit in a master mode and at least one visual sensing unit to act as a visual sensing unit in a slave mode, transmit at least one control signal to the plurality of visual sensing units, and receive the visual data from the plurality of visual sensing units.

BRIEF DESCRIPTION OF THE DRAWINGS

Embodiments of the present invention will be more readily understood from the detailed description of exemplary embodiments presented below considered in conjunction with the attached drawings, of which:

FIG. 2A represents an image plane according to an embodiment of the present invention;

FIG. 2B represents an imagine plane in context with the world plane; and

While the invention is described herein by way of example using several embodiments and illustrative drawings, those skilled in the art will recognize the invention is not limited to the embodiments of the drawings described. It should be understood the drawings and detailed description thereto are not intended to limit the invention to the particular form disclosed, but to the contrary, the invention is to cover all modification, equivalents and alternatives. Thus, it is to be understood that the attached drawings are for purposes of illustrating the concepts of the invention and may not be to scale.

DETAILED DESCRIPTION

Embodiments of the present invention provide at least the following capabilities: 1) active collaborative tracking of multiple targets over a wide area; 2) Passive tracking based on external 2D/3D track data; 3) Visual assessment; 4) Video & track based object designation; 5) Output 2D and 3D tracks for all observed objects.

Figure 1:
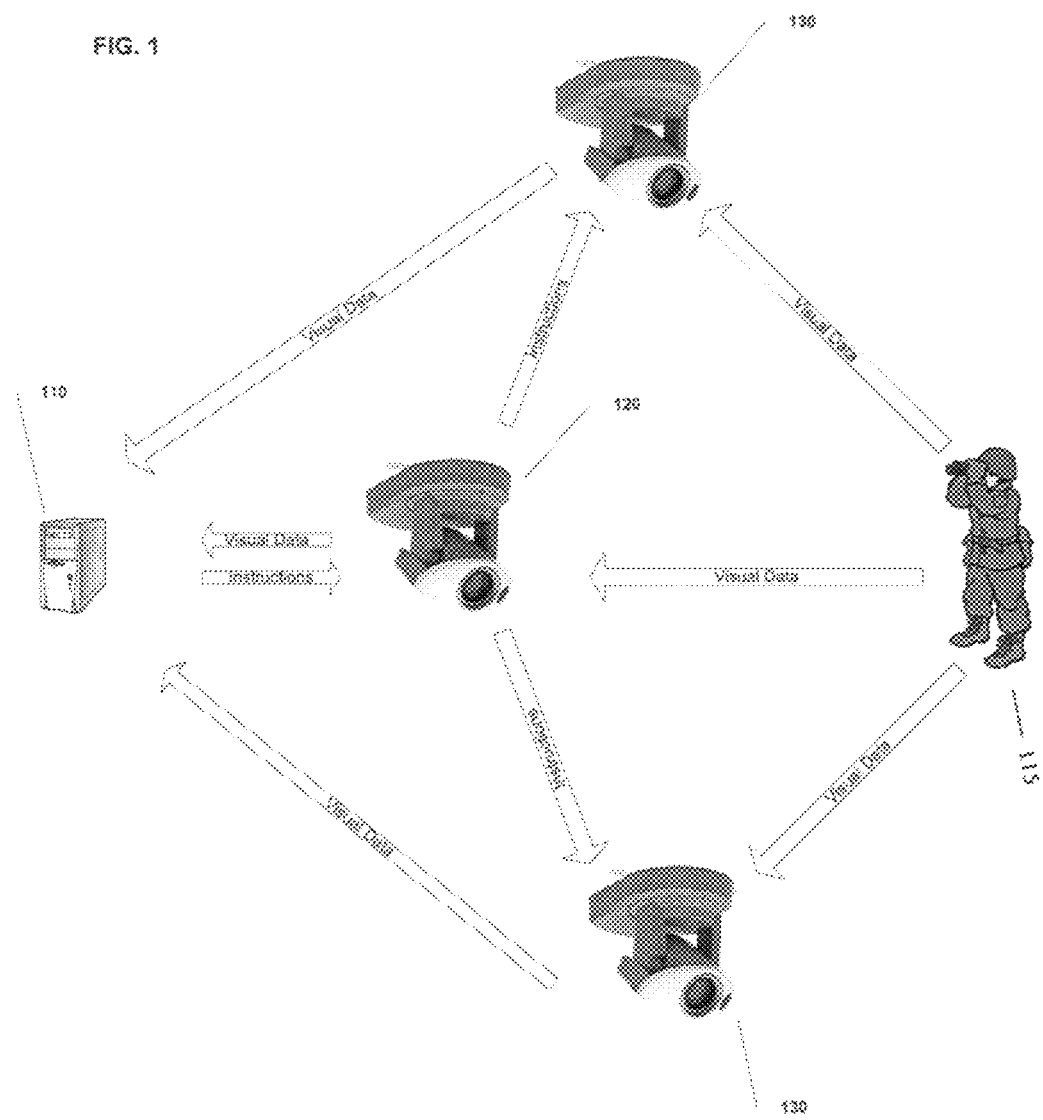
FIG. 1 is a functional block diagram of an exemplary system for performing a PTZ handoff in accordance with an embodiment of the present invention.

With reference to FIG. 1, a system for monitoring a field of view is depicted. The system according to embodiments of the present invention includes manager component 110 which is capable of receiving visual data regarding an at least one object to be tracked and sending at least one control signal to a series of visual sensing units to track the at least one object 115. The system according to embodiments of the present invention also includes visual sensing unit in a master mode 120 associated with the manager component 110 and capable of receiving visual data, transmitting the visual data to the manager component 110 regarding the position of the at least one object 115 to be tracked, receiving the at least one control signal from the manager component 110 for tracking the at least one object 115, and transmitting the at least one control signal to a visual sensing unit in a slave mode 130. Further, the system according to embodiments of the present invention includes at least one visual sensing unit in a slave mode 130 associated with the visual sensing unit in a master mode 120 and the manager component 110 and capable of receiving visual data regarding the location of the at least one object 115, transmitting the visual data to the manager component 110 regarding the location of the at least one object 115 to be tracked, and receiving the at least one control signal from the visual sensing unit in the master mode 120 for tracking the at least one object 115.

In embodiments according to the present invention, the manager component is, but is not limited to, a server. In further embodiments according to the present invention, the manager component is, but is not limited to, a computer. In further embodiments according to the present invention, the manager component is, but is not limited to, a computer program. In further embodiments according to the present invention, the manager component is, but is not limited to, an algorithm. In further embodiments according to the present invention, the manager component is, but is not limited to, a list of instructions that implicitly implement an algorithm.

Embodiments of the present invention include a plurality of PTZ cameras in the master mode 120 and a plurality of PTZ cameras in the slave mode 130. In embodiments of the present invention, PTZ cameras in the master mode 120 share a field of view with other PTZ cameras in the master mode 120. In other embodiments of the present invention, PTZ cameras in the master mode 120 share a field of view with PTZ cameras in the slave mode 130. In further embodiments of the present invention, PTZ cameras in the slave mode 130 share a field of view with other PTZ cameras in the slave mode 130. One of skill in the are will appreciate various arrangements of PTZ cameras in the master mode 120 and PTZ cameras in the slave mode 130 are within the scope of the present invention and are contemplated by the present invention.

In embodiments of the present inventions, the PTZ cameras in the master mode 120 and the PTZ cameras in the slave mode 130 produce video output streams that consists of the video taken of the field of view of the PTZ cameras in the master mode 120 and the PTZ cameras in the slave mode 130. Further, in embodiments of the present invention the PTZ cameras in the master mode 120 and the PTZ cameras in the slave mode 130 receive control signals as input that control the pan, tilt and zoom values for the PTZ cameras in the master mode 120 and the PTZ cameras in the slave mode 130.

In embodiments of the present invention, the PTZ cameras in master mode 120 and the PTZ cameras in the slave mode 130 each contain a tracker component which assigns identification information to each object within its field of view. In embodiments of the present invention, the identification information may include, but is not limited to, the position, size, shape, velocity and acceleration of the object. According to an embodiments of the present invention the position of an object is described in terms of the position of its centroid in the image. The term "centroid" is known to those of skill in the art. The shape of the object is denoted using a gaussian model. Guassian models are known to those of skill in the art. The identification information for each object is preserved over all the images for a given camera.

In embodiments of the present invention, the PTZ manager 110 receives a set of objects detected by the PTZ cameras in the master mode 120 and the PTZ cameras in the slave mode 130 as input. The functionality of the PTZ manager 110 is to control the PTZ cameras in the master mode 120 and the PTZ cameras in the slave mode 130 such that the field of view of the each of the PTZ cameras in the master mode 120 and the PTZ cameras in the slave mode 130 always keeps a designated object at the center.

For each object, the amount of pan or tilt required to accomplish this is computed based on the position of the object. The zoom is decided based on the size of the object. The identification information about the object being followed is passed from the PTZ manager 110 to the PTZ cameras in the master mode 120 and the PTZ cameras in the slave mode 130 that have a field of view overlapping with the PTZ camera in the master mode 120 or the PTZ camera in the slave mode 130 that sent input to the PTZ manager 110 regarding the object's location.

The PTZ manager 110 also keeps a track of current pose information of the PTZ cameras in the master mode 120 and the PTZ cameras in the slave mode 130 that it is controlling. Using the pose information, the PTZ manager 110 computes the 3D position of all the objects it receives as input. It passes these 3D positions to the PTZ cameras in the master mode 120 and the PTZ cameras in the slave mode 130 that have a field of view overlapping with the PTZ camera in the master mode 120 or the PTZ camera in the slave mode 130 that sent input to the PTZ manager 110 regarding the object's location.

In embodiments of the present invention one function of the PTZ manager 110 is to keep the object being followed in the center of the field of view of the PTZ cameras in the master mode 120 and the PTZ cameras in the slave mode 130. The amount of pan, tilt and zoom required to accomplish this is computed by projecting the 3D position of the designated object onto the image captured by the PTZ cameras in the master mode 120 and the PTZ cameras in the slave mode 130 using the current pose information of the PTZ cameras in the master mode 120 and the PTZ cameras in the slave mode 130.

On or more of the following factors, all of which are known to those of skill in the art, are used in embodiments of the present invention as input from the PTZ cameras in the master mode 120 and the PTZ cameras in the slave mode 130 to determine the 3D position of objects:

2D position in of the image of the object (centroid of the object)( i.e., the x, y coordinates));
   Gaussian denoting the shape of the object;
   Pose information of the camera i.e. P (3×4 Matrix); and
   The Equation of the World Plane i.e. $Ax+By+Cz+D=O$ In operation, as shown in FIGS. 2A and 2B, the centroid of the object in the image is usually away from the ground plane. This may lead to greater errors in the 3D position of the object in the world plane. Accordingly, in one embodiment of the present invention, an initial step is to estimate the position of the foot of the object. The term "foot" is known to those of skill in the art. This may be performed by projecting the centroid of the object onto the base of the bounding box of the object, which in turn is computed using the gaussian. The term "gaussian" is known to those of skill in the art.

FIG. 2A represents the image plane, which is understood by those of skill in the art. The center dot 210 denotes the centroid of the object. The oval 220 denotes the gaussian. The dotted rectangle 230 denotes the bounding box and the dot 240 outside of the oval and within the dotted rectangle 230 denotes the foot position that is used for computing the 3D position of the object in the world plane.

Once the foot position 240 is estimated by methods known to those of skill in the art, standard projective geometry is used by methods known to those of skill in the art to find the equation of the ray from the center of the camera passing through the foot of the object in the image. Given the foot location in the image, the equation of the ray is given in the parametric form by the following equation: $\lambda P^{-1}x+1$, where the pose matrix is $P=[P|-P \cdot t]$ and x is the image point is homogenous coordinates.

Once the equation of the ray is known, its point of intersection is found with the ground plane to get the 3D position of the object. FIG. 2B depicts the image plane in context with the world plane, which is understood by those of skill in the art.

In embodiments of the present invention, the PTZ manager 110 keeps track of the current state of all the PTZ cameras. The state of a given PTZ camera includes, but is not limited to, the PTZ camera's location, pose, and field of view. A PTZ camera's pose includes, but is not limited to, the direction it is facing and the orientation of its pan, tilt and zoom features. Any PTZ camera in the master mode 120 that wants to acquire ownership of a PTZ Camera in the slave mode 130 must first take permission from the PTZ manager 110 in order to do so. The PTZ manager 110 maintains ownership information for each PTZ Camera. Each PTZ camera in the master mode 120 owns a given PTZ camera in the slave mode 130 for a given time duration. In embodiments of the present invention, the function of the PTZ manager 110 is to give ownership of a PTZ camera in the slave mode 130 to a new PTZ camera in the master mode 120 if a PTZ camera in the master mode 120 requests it or if no PTZ camera in the master mode 120 currently owns it.

The PTZ manager 110 receives the 3D position of all the objects being detected by all the PTZ cameras in the system. It also has knowledge about which PTZ cameras have overlapping fields of view. This module also has the zone mask images, which are known to those of skill in the art, of each of the PTZ cameras, and which can be used to determine whether a given 3D position in the world can be viewed from a given PTZ camera.

In embodiments of the present invention, a function of the PTZ manager 110 is to assign PTZ cameras in the slave mode 130 to those PTZ cameras that are in master mode 120. Also, in embodiments of the present invention the PTZ manager 110 is able to make associations among the objects being tracked so once an object moves out of the visibility of a PTZ camera in the master mode 120, the PTZ manager can then assign one of the PTZ cameras in the slave mode 130 to become a PTZ camera in the master mode 120 and continue to following the object.

In embodiments of the present invention, the PTZ manager 110 maintains data regarding the 3D position of the object that a given PTZ in the master mode 120 is following.

In embodiments of the present invention, the PTZ manager 110 generates a list of PTZ cameras in the slave mode 136 that have their field of view overlapping with the PTZ camera in the master mode 120. Those PTZ cameras in the slave mode 130 that are assigned to the PTZ camera in the master mode 120 are those that have an overlapping field of view with the PTZ camera in the master mode 130, can see the current 3D position of the object being tracked, and are free to be assigned to a PTZ camera in the master mode 120 other than the one to which they are currently assigned. The decision about visibility of the 3D position of the object by a PTZ in the slave mode 130 is made using the zone mask image of the PTZ in the slave mode 130. In embodiments of the present invention, PTZ cameras in the master mode 120 may query the PTZ manager 110 to determine whether a PTZ camera in the slave mode 130 is available. A PTZ camera in the slave mode 130 is available, for example, if it is not committed to following another object at the time that a PTZ camera in the master mode 120 requests it.

In embodiments of the present invention, votes, which are known to those of skill in the art, are cast by all the objects detected by PTZ cameras in the slave mode 130. The votes of only those objects are counted whose 3D position are within a pre-decided radius of the 3D position of the object being tracked by the PTZ camera in the master mode 120.

Figures 3, 3A, 3B, 3C:
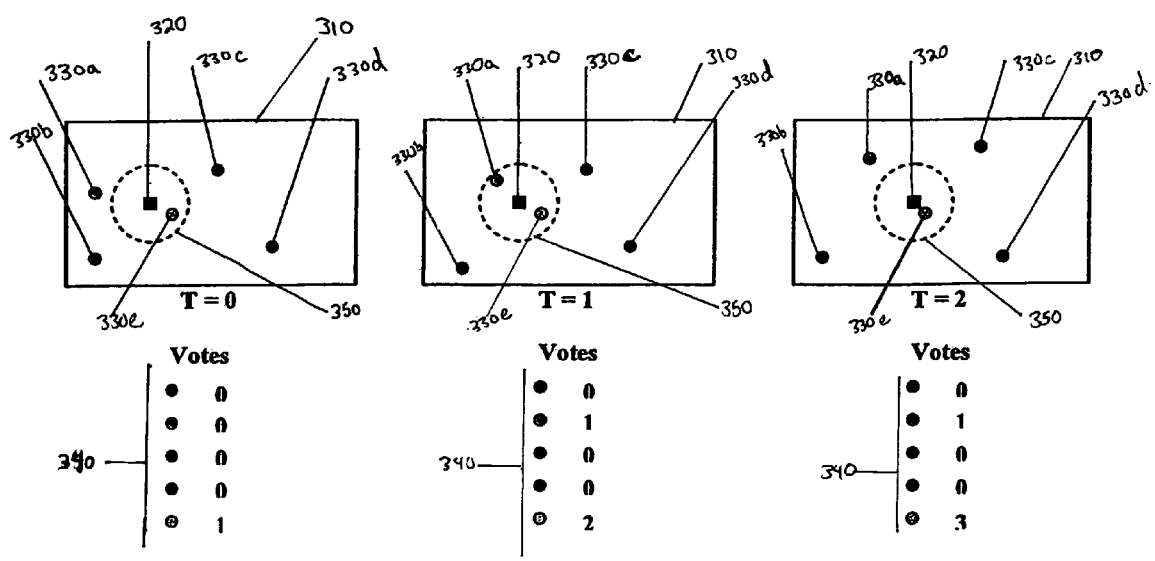
FIG. 3A-3C represent the 3D positions of objects at three consecutive points in time.

In FIG. 3A-3C, the 3D positions of objects are shown at three consecutive points of time. The outer rectangle 310 denotes the world plane. The square 320 denotes the 3D position of the object being followed by the PTZ camera in the master mode 120. The solid-line circles 330a, 330b, 330c, 330d and 330e denote the objects being detected by one of the PTZ cameras in the slave mode 130. Also below each frame, the voting field 340 is shown corresponding to that frame. The dotted circle denotes the search radius 350. Only those objects detected by the PTZ camera in the slave mode 120 that are within the search radius 350, cast votes at any given frame.

Checks that are made at subsequent iterations to determine whether an object that was being followed by the PTZ camera in the master mode 120 is still detected by the PTZ camera in the master mode 120 or not.

If the object is still visible to the master in a subsequent iteration, then the list of PTZ cameras in the slave mode 130 is updated based upon whether the new 3D position of the object being followed by the PTZ camera in the master mode 120 is still visible to each of the PTZ cameras in the slave mode 130 or not.

In embodiments of the present invention, objects may be assigned different levels of priority by the operator of the system. Thus, for example, an intrusion along a wall may be assigned a higher priority than in intrusion at a main gate where, perhaps, there are guards or other protective measures in place.

Thus, in embodiments of the present invention, the PTZ manager 110 may have given ownership of a PTZ camera in the slave mode 130 which is on the list of PTZ cameras in the slave mode 130 to a PTZ camera in the master mode 120 which is tracking an object with a higher priority. In this scenario, a new list of PTZ cameras in the slave mode 130 is generated which takes into account that this PTZ camera in the slave mode 130 has been assigned to a PTZ camera in the master mode 120 which is tracking an object with a higher priority.

In further embodiments of the present invention, if an object that is desired to be tracked is not visible to a camera in the master mode 120, then one of PTZ cameras in the slave mode 130 is designated by the PTZ manager 110 as a PTZ camera in the master mode 120. The PTZ manager 110 makes the determination regarding which PTZ camera in the slave mode 130 is to be designated a PTZ camera in the master mode 120 based on the number of votes associated with each of the PTZ cameras in the slave mode 130.

While the foregoing is directed to embodiments of the present invention, other and further embodiments of the invention may be devised without departing from the basic scope thereof.

What is claimed is:

1. A system for tracking at least one object, comprising:
   a plurality of communicatively connected visual sensing units in a single camera system configured to capture visual data related to the at least one object; and
   a manager component communicatively connected to the plurality of visual sensing units, where the manager component is configured to:
   assign one visual sensing unit of the plurality of visual sensing units to act as a visual sensing unit in a master mode and the remainder of the plurality of visual sensing units to act as visual sensing units in a slave mode;

receive one or more votes cast by all objects detected by the plurality of visual sensing units in slave mode that are positioned within a pre-decided area; and respond to non-visibility of the at least one object tracked by the visual sensing unit in a master mode by determining a designated one of the plurality of visual sensing units in the slave mode to be in the master mode and designating the formerly assigned visual sensing unit in the master mode to be in the slave mode based on the cast one or more votes.

2. The system of claim 1, wherein at least one visual sensing unit in the slave mode has a field of view which overlaps with the field of view of the visual sensing unit in the master mode.

3. The system of claim 1, wherein at least one visual sensing unit in the slave mode has a field of view which overlaps with the field of view of another visual sensing unit in the slave mode.

4. The system of claim 1, wherein the plurality of visual sensing units are pan-tilt-zoom cameras.

5. The system of claim 4, wherein at least one control signal controls the pan, tilt and zoom values of a visual sensing unit to which it is directed.

6. The system of claim 1, wherein the manager component maintains data regarding the field of view of the visual sensing unit in the master mode.

7. The system of claim 1, wherein the manager component maintains data regarding the field of view of at least one visual sensing unit in the slave mode.

8. The system of claim 1, wherein the manager component maintains data regarding the pose of the visual sensing unit in the master mode.

9. The system of claim 1, wherein the manager component maintains data regarding the pose of at least one visual sensing unit in the slave mode.

10. The system of claim 1, wherein the visual sensing unit in the master mode maintains ownership of at least one visual sensing unit in the slave mode associated with it.

11. The system of claim 1, wherein the at least one object to be tracked casts an at least one vote of the one or more votes which corresponds to the position of the at least one object to be tracked.

12. The system of claim 11, wherein the pre-decided area is a predecided radius established by the manager component.

13. The system of claim 1, wherein the manager component maintains information regarding which visual sensing unit in the slave mode is associated with the visual sensing unit in the master mode.

14. The system of claim 1, wherein the manager component determines whether at least one visual sensing unit in the slave mode is assigned to be the visual sensing unit in the master mode that is tracking an object which an operator of the system has determined to have a higher priority than another object being tracked by the visual sensing unit in a master mode seeking to acquire a visual sensing unit in the slave mode.

15. A method for monitoring a field of view, comprising arranging a plurality of communicatively connected visual sensing units in a single camera system configured to capture visual data related to at least one object to be tracked, connecting a manager component communicatively to the plurality of connected visual sensing units, assigning, via the manager component, one visual sensing unit to act as a visual sensing unit in a master mode and at least one visual sensing unit to act as a visual sensing unit in a slave mode;

receiving one or more votes cast by all objects detected by the plurality of visual sensing units in slave mode that are positioned within a predefined area; and responding, via the manager component. to non-visibility of the at least one object tracked by the visual sensing unit in a master mode by determining a designated one of the plurality of visual sensing units in the slave mode to be in the master mode and designating the formerly assigned visual sensing unit in the master mode to be in the slave mode based on the one or more votes.

16. The method of claim 15, wherein determining comprises determining which one of the visual sensing units in the slave mode has the most objects within its field of view that are within a defined radius of the at least one object tracked by the visual sensing unit in a master mode.

17. The system of claim 1, wherein determining comprises determining which one of the visual sensing units in the slave mode has the most objects within its field of view that are within a defined radius of the at least one object tracked by the visual sensing unit in a master mode.

* * * * *